Sept. 29, 1953  R. MacDONALD  2,653,746
MEASURING AND FILLING DEVICE
Filed Dec. 17, 1952
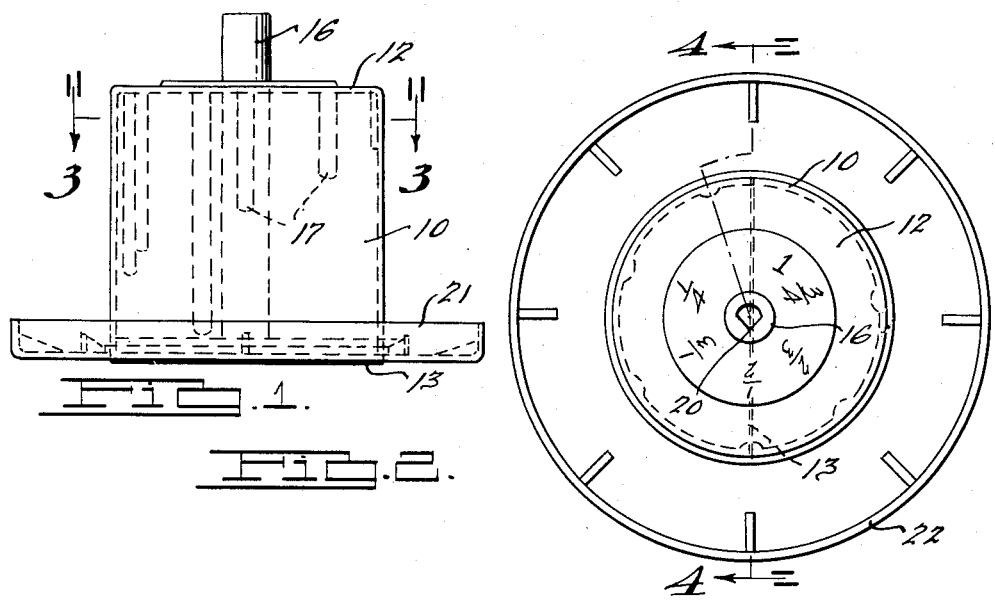
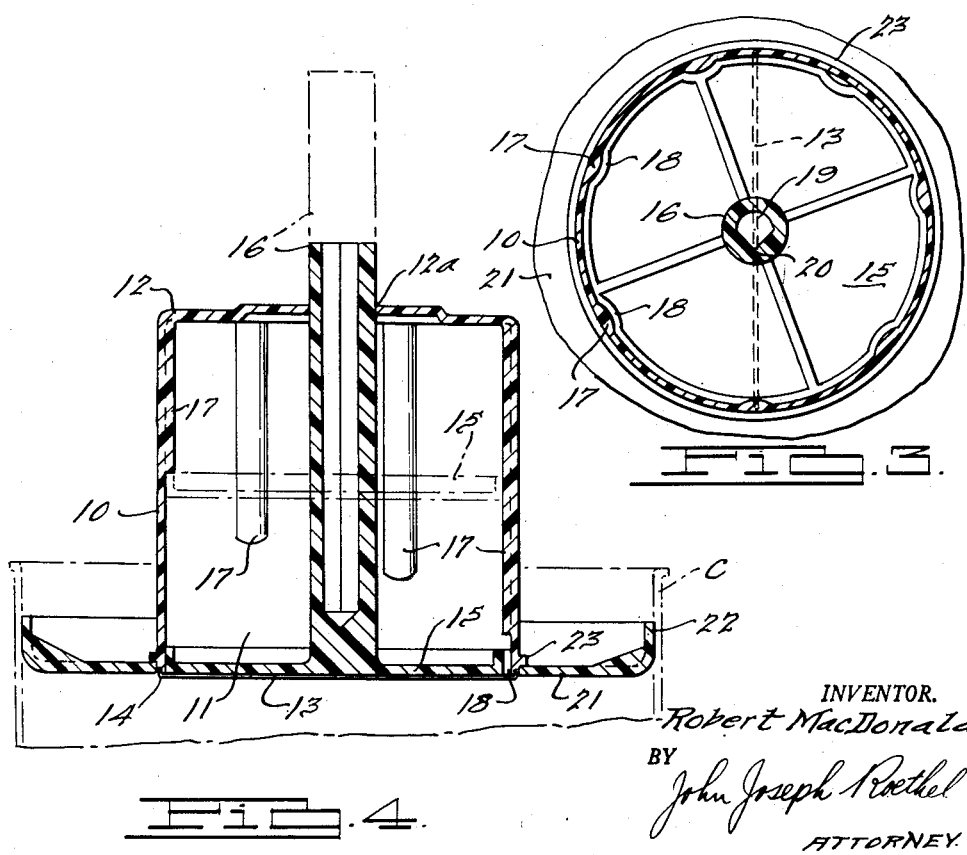
INVENTOR.
Robert MacDonald.
BY John Joseph Roethel
ATTORNEY Patented Sept. 29, 1953

2,653,746

UNITED STATES PATENT OFFICE 2,653,746

MEASURING AND FILLING DEVICE

Robert MacDonald, Rochester, Mich.

Application December 17, 1952, Serial No. 326,430

10 Claims. (Cl. 226—125)

This invention relates to improvements in measuring and filling devices and particularly that type which is adapted to be used for removing a predetermined quantity of shortening or the like from its container, it being an object of the present invention to provide a measuring or filling device which is simple, compact and durable of construction and comparatively inexpensive to manufacture.

The dispensing device embodied in the present invention comprises a cylindrical shell, preferably molded from a plastic material, the shell being closed at one end and open at the other end. A plunger head having a tubular rod secured thereto is movably carried within said shell, said rod projecting through an aperture in the closed end of the shell and adapted to be manually grasped for rotating the plunger head or longitudinally moving the same. The shell is provided with a series of longitudinally extending graduated ribs formed on the inner surface thereof and the plunger head is provided with a series of notches complementarily shaped to accommodate said ribs and circumferentially spaced to correspond to the spacing of said ribs, the circumferential spaces between two of said notches being twice the space between adjacent notches thus providing a location on the circumference of said plunger at which a notch has been omitted. The plunger head upon rotation thereof to position said notchless location in line with a selected rib is then longitudinally movable toward the closed end of the shell until said notchless location abuts the end of said selected rib thereby being adapted to measure a predetermined quantity of matter, such as shortening. Indicating means are also provided to indicate the setting of the plunger head and thereby the quantity of matter that will be measured.

Since the diameter of the cylindrical shell generally will be found to be smaller than the container from which the shortening, for example, is to be measured, an annular ring having a slip fit in the container is first inserted therein. The open end of the cylindrical shell is then seated on the annular ring and the exertion of pressure toward the bottom of the container acts to force the shortening or the like up into the shell until movement of the plunger is prevented by the preselected graduated rib.

Other features and objects will appear in the following description and appended claims; reference being had to the accompanying drawings forming a part of this specification wherein like reference characters designate corresponding parts in the several views.

Fig. 1 is a side elevation of the device.

Fig. 2 is a top plan view.

Fig. 3 is a horizontal section taken on line 3—3 of Fig. 1 looking in the direction of the arrows.

Fig. 4 is a vertical section taken on line 4—4 of Fig. 2 looking in the direction of the arrows.

Before explaining in detail the present invention it is to be understood that the invention is not limited in its application to the details of construction and arrangements of parts illustrated in the accompanying drawings, since the invention is capable of other embodiments and of being practiced or carried out in various ways. Also it is to be understood that the phraseology or terminology employed herein is for the purpose of description and not of limitation.

In the drawing, wherein for the purpose of illustration is shown the preferred embodiment of my invention, the numeral 10 designates a cylindrical shell forming the body of the device, the lower portion thereof being open as at 11 and the upper portion 12 being closed with the exception of an aperture 12a to permit movement of a plunger rod therethrough. At the lower portion of the shell 10, a wire 13 is tightly drawn diametrically across the opening 11, the ends of the wire being secured to the shell as at 14.

A plunger 15 is movably fitted within the shell 10 and is actuated by a plunger rod 16 preferably formed integrally therewith, the plunger rod projecting upwardly through the aperture 12a in the upper portion 12 of the shell.

The inner wall 10 of the shell 10 is formed with a series of longitudinally extending ribs 17 of varying lengths, the ribs 17 extending downwardly from the upper portion 12 of the shell 10. In the illustrated embodiment six ribs 17 are provided, the ribs being spaced on increments of substantially one-seventh of the inner circumference of the shell 10, or, in effect, leaving one location at which a rib 17 has been omitted. The plunger 15 is provided at its circumferential edge with six notches 18 having the same spacing as the ribs 17. That is, the plunger 15 has six notches spaced on increments of substantially one-seventh of the circumference of the plunger leaving one station at which the notch is omitted. As best shown in Fig. 3, the plunger rod 16 is preferably hollow, the opening 19 therein having a V-shaped portion. It will be noted that the apex 20 of the opening 19 indicates or points at the station on the plunger circumference from which a notch 18 has been omitted, for a reason to be hereinafter explained.

There is also provided a ring 21 having a flange 22 thereon. It has been found that most of the containers in which shortening or the like is sold have a standard inside diameter. Accordingly, the outside diameter of the flange 22 is preferably such that it will fit inside a standard shortening container with a slip fit. The ring 21 is centrally apertured to receive the lower end of the shell 10, the latter being provided with a circumferential rib or flange 23 of greater diameter than the aperture in the ring 21 thereby to locate the shell 10 on the ring.

In operation, the ring 21 is first inserted in the container C from which it is desired to remove a desired quantity of shortening or the like. Next the plunger 15 is rotated so as to place the point thereon from which a notch 18 has been omitted in line with a rib 17 which will permit movement of the plunger upwardly within the shell only a distance sufficient to measure the desired quantity of shortening. For convenience the upper portion 12 of the shell has marked on its surface indicia indicating the quantity of shortening or the like which may be measured by the various settings of the plunger. As illustrated, the plunger is set to measure one-half cup of shortening. After the plunger is set as desired, the shell 10 is placed in position on the ring 21 as shown in Fig. 4. Upon the application of downward pressure, the shortening or the like in the container C is forced through the aperture in the ring 21 up into the shell 10. The plunger 15 will be forced upwardly from its solid line position in Fig. 4 to a position which, in the present instance, is shown in dotted outline to be one-half way up the shell in accordance with the plunger setting indicated in Fig. 2. The plunger 15 will move upwardly until the rib 17 extending longitudinally half way down from the upper portion 12 of the shell 10 is engaged by the edge of the plunger 15 at 18a, the place at which a notch 17 has been omitted. Those ribs 17 which are longer than the rib 17 indicating one-half cup will be in alignment with notches 18 on the plunger 15 and therefore will not impede upward movement thereof.

Upon the shell 10 becoming filled with the desired amount of shortening or the like, it is then bodily rotated to permit the wire 13 to cleanly sever the material in the shell from that remaining in the container C. The shell is then bodily carried to the mixing bowl or utensil into which the shortening or the like is to be placed. The plunger rod 16 is then forced downwardly causing the plunger 15 to act as an ejector. At the end of the downward stroke, the plunger 15 is rotated causing the wire 13 to clean all of the shortening or the like from the plunger surface.

The shell 10 may then be returned to the container C to act as a cover therefor. This is particularly advantageous since it makes a convenient way of storing the measuring device and obviates the necessity of cleaning the same after every usage.

Preferably, the parts of the device embodied in the present invention may be molded out of plastic with the exception of the wire 13. One advantage of molding the device from plastic is that the appearance thereof is enhanced thereby improving its marketability.

I claim:

1. A dispensing device comprising a cylindrical shell closed at one end and open at the other end, a plunger movable within said shell and having a rod secured thereto, said rod projecting through an aperture in the closed end of the shell and having a portion adapted to be manually grasped, said shell having a series of longitudinally extending graduated ribs formed on the inner surface thereof, said plunger having a series of notches complementarily shaped to accommodate said ribs and circumferentially spaced to correspond to the spacing of said ribs, a circumferential space between two of said notches being greater than the space between adjacent notches thus providing a location on the circumference of said plunger at which a notch has been omitted, said plunger after rotation thereof to position said notchless location in alignment with a selected rib being movable longitudinally toward the closed end of said shell until said notchless location abuts the end of said selected rib thereby measuring a predetermined quantity of matter.

2. A dispensing device comprising a cylindrical shell closed at one end and open at the other end, a plunger movable within said shell and having a rod secured thereto, said rod projecting through an aperture in the closed end of the shell and having a portion adapted to be manually grasped, said shell having a series of longitudinally extending graduated ribs formed on the inner surface thereof, said plunger having a series of notches complementarily shaped to accommodate said ribs and circumferentially spaced to correspond to the spacing of said ribs, the circumferential space between two of said notches being twice the space between adjacent notches thus providing a location on the circumference of said plunger at which a notch has been omitted, said plunger after rotation thereof to position said notchless location in alignment with a selected rib being movable longitudinally toward the closed end of said shell until said notchless location abuts the end of said selected rib thereby measuring a predetermined quantity of matter.

3. A dispensing device comprising an annular ring adapted to be inserted into a container of shortening, a cylindrical shell closed at one end and open at the other end, said ring and said shell at the open end thereof have coacting means for locating the shell on said ring and to maintain the shell against lateral displacement relative thereto, a plunger movable within said shell and having a rod secured thereto, said rod projecting through an aperture in the closed end of the shell and having a portion adapted to be manually grasped, said shell having a series of longitudinally extending graduated ribs formed on the inner surface thereof, said plunger having a series of notches complementarily shaped to accommodate said ribs and circumferentially spaced to correspond to the spacing of said ribs, the circumferential space between two of said notches being greater than the spacing between adjacent notches thus providing a location on the circumference of said plunger at which a notch has been omitted, said plunger after rotation thereof to position said notchless location in alignment with a selected rib being movable longitudinally toward the closed end of said shell as the shortening is forced therein by the exertion of downward pressure on said shell and ring, the longitudinal movement of said plunger continuing until said notchless location abuts the end of said selected rib thereby measuring a predetermined quantity of shortening.

4. A dispensing device comprising an annular ring adapted to be inserted into a container of shortening, a cylindrical shell closed at one end and open at the other end, said ring and said shell at the open end thereof have coacting means for locating the shell on said ring and to maintain the shell against lateral displacement relative thereto, a plunger movable within said shell and having a rod secured thereto, said rod projecting through an aperture in the closed end of the shell and having a portion adapted to be manually grasped, said shell having a series of longitudinally extending graduated ribs formed on the inner surface thereof, said plunger having a series of notches complementarily shaped to accommodate said ribs and circumferentially spaced to correspond to the spacing of said ribs, the circumferential space between two of said notches being twice the spacing between adjacent notches thus providing a location on the circumference of said plunger at which a notch has been omitted, said plunger after rotation thereof to position said notchless location in alignment with a selected rib being movable longitudinally toward the closed end of said shell as the shortening is forced therein by the exertion of downward pressure on said shell and ring, the longitudinal movement of said plunger continuing until said notchless location abuts the end of said selected rib thereby measuring a predetermined quantity of shortening.

5. A dispensing device comprising an annular ring adapted to be inserted into a container of shortening, a cylindrical shell closed at one end and open at the other end, said ring and said shell at the open end thereof have coacting means for locating the shell on said ring and to maintain the shell against lateral displacement relative thereto, a plunger movable within said shell and having a rod secured thereto, said rod projecting through an aperture in the closed end of the shell and having a portion adapted to be manually grasped, said shell having a series of longitudinally extending graduated ribs formed on the inner surface thereof, said plunger having a series of notches complementarily shaped to accommodate said ribs and circumferentially spaced to correspond to the spacing of said ribs, the circumferential space between two of said notches being twice the spacing between adjacent ribs thus providing a location on the circumference of said plunger at which a notch has been omitted, said plunger after rotation thereof to position said notchless location in alignment with a selected rib being movable longitudinally toward the closed end of said shell as the shortening is forced therein by the exertion of downward pressure on said shell and ring, the longitudinal movement of said plunger continuing until said notchless location abuts the end of said selected rib thereby measuring a predetermined quantity of shortening, and correlated indicating means on said rod and shell to indicate the position of the notchless location on said plunger relative to the ribs within the shell.

6. A dispensing device comprising a cylindrical shell closed at one end and open at the other end, a plunger movable within said shell and having a rod secured thereto, said rod projecting through an aperture in the closed end of the shell and having a portion adapted to be manually grasped for rotating the plunger head or longitudinally moving the same, said shell having a series of longitudinally extending graduated ribs formed on the inner surface thereof, said ribs extending from said closed end toward said open end, said ribs being spaced on equal increments of the inner circumference of the shell, there being one less rib than the number of said increments, and said plunger having a series of notches complementarily shaped to accommodate said ribs and correspondingly spaced and equal in number to the ribs, thus providing a ribless location on the inner circumference of the shell and a notchless location on the circumference of the plunger, said plunger after rotation thereof to position said notchless location in alignment with a selected rib being movable toward the closed end of the shell until said notchless location abuts the end of said selected rib thereby measuring a predetermined quantity of matter.

7. A dispensing device comprising a cylindrical shell closed at one end and open at the other end, a plunger movable within said shell and having a rod secured thereto, said rod projecting through an aperture in the closed end of the shell and having a portion adapted to be manually grasped for rotating the plunger head or longitudinally moving the same, said shell having a series of longitudinally extending graduated ribs formed on the inner surfaces thereof, said ribs extending from said closed end toward said open end, said ribs being spaced on equal increments of the inner circumference of the shell, there being one less rib than the number of said increments, and said plunger having a series of notches complementarily shaped to accommodate said ribs and correspondingly spaced and equal in number to the ribs, thus providing a ribless location on the inner circumference of the shell and a notchless location on the circumference of the plunger, said ribless location and said notchless location when in alignment permitting longitudinal movement of the plunger for the full length of said shell.

8. A dispensing device comprising a cylindrical shell closed at one end and open at the other end, a plunger movable within said shell and having a rod secured thereto, said rod projecting through an aperture in the closed end of the shell and having a portion adapted to be manually grasped for rotating the plunger head or longitudinally moving the same, said shell having a series of longitudinally extending graduated ribs formed on the inner surface thereof, said ribs extending from said closed end toward said open end, said ribs being spaced on equal increments of the inner circumference of the shell, there being one less rib than the number of said increments, and said plunger having a series of notches complementarily shaped to accommodate said ribs and correspondingly spaced and equal in number to the ribs, thus providing a ribless location on the inner circumference of the shell and a notchless location on the circumference of the plunger, said plunger after rotation thereof to position said notchless location in alignment with a selected rib being movable toward the closed end of the shell until said notchless location abuts the end of said selected rib thereby measuring a predetermined quantity of matter, and correlated indicating means on said rod and shell to indicate the position of the notchless location on said plunger relative to said graduated ribs.

9. A dispensing device comprising an annular ring adapted to be inserted into a container of shortening, a cylindrical shell closed at one end and open at the other end, said ring and said shell at the open end thereof have coacting means for locating the shell on said ring and to maintain the shell against lateral displacement relative thereto, said rod projecting through an aperture in the closed end of the shell and having a portion adapted to be manually grasped for rotating the plunger head or longitudinally moving the same, said shell having a series of longitudinally extending graduated ribs formed on the inner surface thereof extending from said closed end toward said open end, said ribs being spaced on equal increments of the inner circumference of the shell, there being one less rib than the number of said increments, and said plunger having a series of notches complementarily shaped to accommodate said ribs and correspondingly spaced and equal in number to the ribs, thus providing a ribless location on the inner circumference of the shell and a notchless location on the circumference of the plunger, said plunger after rotation thereof to position said notchless location in alignment with a selected rib being movable toward the closed end of the shell as the shortening is forced therein by the exertion of downward pressure on said shell and ring, the longitudinal movement of said plunger continuing until said notchless location abuts the end of said selected rib thereby measuring a predetermined quantity of shortening.

10. A dispensing device comprising an annular ring adapted to be inserted into a container of shortening, a cylindrical shell closed at one end and open at the other end, said ring and said shell at the open end thereof have coacting means for locating the shell on said ring and to maintain the shell against lateral displacement relative thereto, said rod projecting through an aperture in the closed end of the shell and having a portion adapted to be manually grasped for rotating the plunger head or longitudinally moving the same, said shell having a series of longitudinally extending graduated ribs formed on the inner surface thereof extending from said closed end toward said open end, said ribs being spaced on equal increments of the inner circumference of the shell, there being one less rib than the number of said increments, and said plunger having a series of notches complementarily shaped to accommodate said ribs and correspondingly spaced and equal in number to the ribs, thus providing a ribless location on the inner circumference of the shell and a notchless location on the circumference of the plunger, said plunger after rotation thereof to position said notchless location in alignment with a selected rib being movable toward the closed end of the shell as the shortening is forced therein by the exertion of downward pressure on said shell and ring, the longitudinal movement of said plunger continuing until said notchless location abuts the end of said selected rib thereby measuring a predetermined quantity of shortening, and correlated indicating means on said rod and shell to indicate the position of the notchless location on said plunger relative to the ribs within the shell.

ROBERT MacDONALD.

References Cited in the file of this patent

UNITED STATES PATENTS

| Number | Name | Date |
|---|---|---|
| 1,724,766 | McCauley | Aug. 13, 1929 |
| 2,256,865 | Gilbert | Sept. 23, 1941 |
| 2,328,995 | Olds | Sept. 7, 1943 |
| 2,479,007 | Gruben | Aug. 16, 1949 |
| 2,625,044 | Christie | Jan. 13, 1953 |
| 2,625,824 | Moe | Jan. 20, 1953 |